United States Patent [19]

Hirvela et al.

[11] 3,891,971

[45] June 24, 1975

[54] SERIAL DATA MULTIPLEXING APPARATUS

[75] Inventors: Robert J. Hirvela, Cedar Rapids; Robert A. Bolin, Marion, both of Iowa

[73] Assignee: Rockwell International Corporation, El Segundo, Calif.

[22] Filed: July 27, 1973

[21] Appl. No.: 383,237

Related U.S. Application Data

[63] Continuation-in-part of Ser. No. 197,905, Nov. 11, 1971, abandoned.

[52] U.S. Cl. .......... 340/172.5

[51] Int. Cl. .......... G06f 3/04

[58] Field of Search .......... 340/172.5; 179/15 BV

[56] References Cited

UNITED STATES PATENTS

| | | | |
|---|---|---|---|
| 3,068,463 | 12/1962 | Goldman | 179/15 BV |
| 3,437,755 | 4/1969 | Brown | 179/15 BV |
| 3,441,674 | 4/1969 | Giordano et al. | 179/15 BV |
| 3,573,752 | 4/1971 | Lyghounis et al. | 340/172.5 |
| 3,665,408 | 5/1972 | Sanders et al. | 340/172.5 |
| 3,708,786 | 1/1973 | Hardin et al. | 340/172.5 |
| 3,749,839 | 7/1973 | Forngsiero et al. | 179/15 BV |
| 3,749,841 | 7/1973 | Cohen et al. | 179/15 BA |

*Primary Examiner*—Gareth D. Shaw

*Assistant Examiner*—Mark Edward Nusbaum

*Attorney, Agent, or Firm*—Bruce C. Lutz

[57] ABSTRACT

A device for receiving data on a plurality of parallel lines wherein the data on specific ones of said parallel lines occur at different rates. The apparatus utilizes clock information obtained with said data. The apparatus further samples each line at a rate at least as fast as the data on any line can be presented but only places the sampled data in scratch pad memory once for each clock occurrence. Upon completion of assembly of each data word, it is transferred to buffer storage memory. The apparatus as described will eliminate or dump data from prescribed sources by placing all undesired data words in an unaccessed or write only place in buffer storage memory while forwarding the desired data words to their appropriate retrievable places in buffer storage memory.

3 Claims, 6 Drawing Figures

PATENTED JUN 24 1975 3,891,971

SHEET 1

SERIAL DATA MULTIPLEXING APPARATUS

This is a continuation in part of application Ser. No. 197,905 filed Nov. 11, 1971, now abandoned.

THE INVENTION

The present invention is generally related to electronics and more specifically related to multiplexing apparatus.

In the prior art there are many instances wherein digital words are being received in parallel a bit at a time from a plurality of sources and which need to be transmitted as assembled words in either parallel or serial form to a load such as a computer. A prior art patent capable of accomplishing such a result is a R. J. Hirvela U.S. Pat. No. Re. 26,984 issued Nov. 24, 1970, and assigned to the same assignee as the present invention. At times the data bits supplied from the various sources occur at different data rates. A further patent in the name of Barker et al U.S. Pat. No. 3,229,259 issued Jan. 11, 1966, discloses additional features which may be utilized to cope with the problem of various sources having different data rates. This was accomplished by using oscillators of different frequencies to sample the various sources at times which are in synchronism with the frequency of the data bits being supplied.

The present invention utilizes a single frequency oscillator which is set to sample at a frequency at least as great as the frequency with which the data bits are supplied from the highest frequency source. This may be accomplished by requiring that the sources supply a timing bit or clock bit once for the occurrence of each data bit. However, a phase lock loop or other circuit may be used to extract clock information from the incoming data and the same result will be obtained. Thus, if the low frequency source is sampled several times during a data bit, only one sample will be utilized in constructing a digital word.

The present invention also may be used in situations where the time between consecutive data bits for a given word from a given source does not remain constant.

Thus, the present invention can operate with data sources which are more erratic than the constraints imposed upon the data sources utilized by the Barker et al. invention and in addition can operate with a plurality of sources each having its own data rate and still utilize less complex apparatus than is disclosed in the Barker et al invention referenced supra.

It is thus an object of the present invention to provide an improved digital data multiplexing apparatus.

Figure 1:
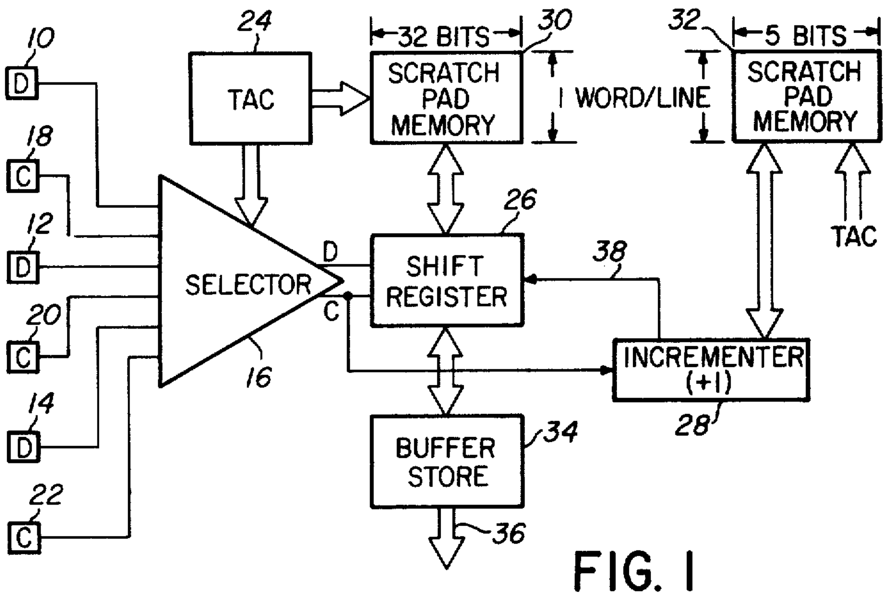
FIG. 1 is a block schematic diagram of the basic invention.
Figure 2:
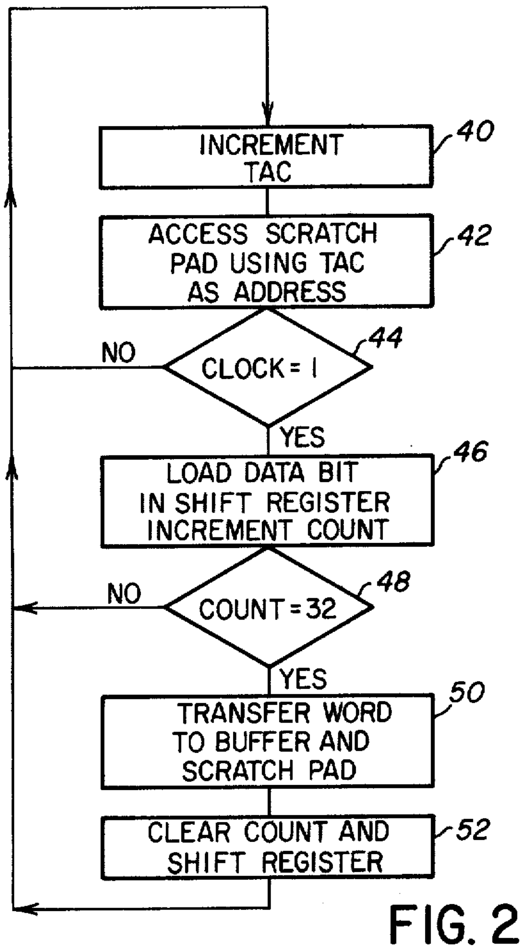
FIG. 2 is a flow chart of the basic invention of FIG. 1.

Other objects and advantages of the present invention will be apparent from a review of the specification and appended claims along with the drawings wherein:

FIGS. 1 and 2

In FIG. 1 a plurality of data sources 10, 12, and 14 are connected to supply inputs to a selector circuit designated as 16. Associated with the data sources 10, 12 and 14 are clock sources 18, 20, and 22, respectively. Each of these clock sources are also connected to selector 16. A time address counter (TAC) 24 is connected to supply inputs to selector 16 to sequentially gate through each of the data sources, if not previously sampled, to a shift register 26. A clock output of selector 16 is supplied both to shift register 26 and to an incrementor 28. Outputs of time address counter 24 are also supplied to first and second scratch pad memories 30 and 32. Scratch pad memory 30 is 32 bits in length while scratch pad 32 is shown as being 5 bits in length.

As will be realized, although specific numbers are utilized throughout this specification, they are utilized to be illustrative of one embodiment of the invention and are not intended to be limiting. Further, the broad lines or connection paths between blocks are intended to illustrate the utilization of parallel connections. Again, however, this is not to be restrictive and some of the lines shown in conventional fashion may contain more than one parallel line.

With these constraints it will be realized that there is a dual action transfer of parallel data between blocks 30 and 26 and similar transfer of information between blocks 32 and 28. A further transfer of data in parallel is provided between shift register 26 and a buffer store block 34 having a parallel output 36. A final connection in FIG. 1 is a connection 38 from the incrementor 28 to the shift register 26 for the purpose of providing an indication that the 32 bits of a word have been assembled.

As shown in FIG. 2 the TAC is incremented in state 40 and then action in initiated in accessing scratch pads 30 and 32 using TAC as shown in state 42. Once the scratch pad is accessed with the new time address clock, a decision block 44 determines whether or not the clock flip-flop in selector 16 is set or equals a one. If there has not been a new clock received since the last access, the program leaves by the NO line and returns to state 40. If a clock has been received since the last access, then the device continues to state 46 wherein a data bit is loaded into the shift register and the count incremented. A decision block 48 illustrates that the count is checked after incrementation and if the count does not equal 32 it returns again to state 40. If the count is 32 then the word is complete and it is transferred as shown in state 50 to the buffer store 34 and to the scratch pad memory 30 and the device continues to state 52 where the count is cleared and the device is now ready to accept new data from the data sources. It will be realized that the old data is cleared from the shift register and thus the scratch pad memory as new data is received or shifted in. After state 52 the device returns to state 40. The TAC is then incremented and the scratch pad accessed to place the partially assembled next word into the shift register so that the next data line in the sequence may be checked to determine if a clock bit has been received since the last data bit was sampled. That partially assembled word may also be described as the word as assembled "to date" and merely means as assembled since the last data bit was received and assembled.

Tracing the above actions in a different format, it may be assumed that the address in block 24 is such that data source 10 is addressed. Such an address will place whatever portion of a digital word corresponding to that received from source 10 is found in memory 30 into shift register 26. This same address will also cause a corresponding count portion of 32 in memory 32 into incrementor 28. Finally, it will select line 10 of all the incoming lines to be applied to shift register 26. The device will then check the flip-flop corresponding to incoming line 18. If a clock has been received since the last access of data lien 10, the new data bit will be loaded into shift register 26 and the word will be transferred back to scratch pad memory 30 while the block 28 is incremented and its numerical value checked to see if it is 32. If it is not 32, then this numerical value is loaded back to the corresponding position in memory 32. If on the other hand the numerical value is 32, the word from shift register 26 will be loaded into buffer store 34.

Returning to an earlier portion in the description of the above paragraph, if a clock had not been received since the last access, the device will then pass on to the next data source such as 12 and pursue the same operation.

The 32 bit digital word may contain an address as well as data information and in such an instance the address is checked while the word is in shift register 26. It may be that some messages coming in on line 10 are of the type which it is desired that should go out on line 36. In this instance the shift register 26 would place such a word in a predetermined portion in the buffer store 34. However, it is also possible that line 10 would provide data from many different digital data sources and that most of these digital words would not be required by the load connected to lead 36. In such an instance the shift register 26 may be programmed to store all of these words in a specific portion of buffer store 34 where they cannot be retrieved. Since one word is inserted on top of the last word on each occurrence of reception of an undesired digital word, the information in this channel is meaningless besides being unretrievable.

FIGS. 3–5

Figure 3:
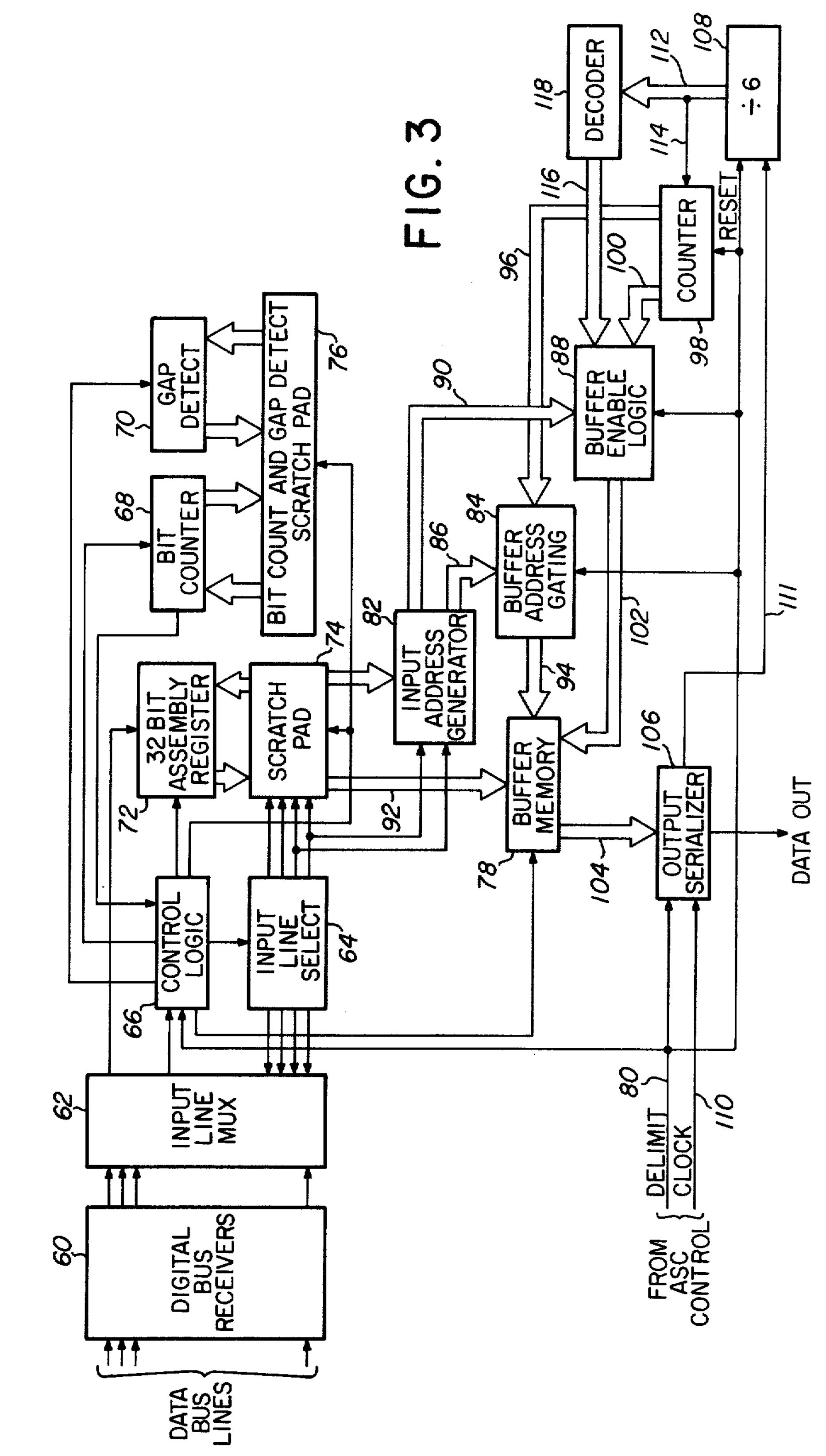
FIG. 3 is a block diagram of a given embodiment of the invention and is shown in more detailed form than is FIG. 1.

In FIG. 3 a block 60 labeled "DIGITAL BUS RECEIVERS" receives a plurality of data bus lines. This digital bus receiver block 60 in combination with an input line multiplex block 62 accomplishes the functions of selector 16 of FIG. 1. An input line select block 64 accomplishes some of the functions of the TAC 24 of FIG. 1. A control logic block 66 which is connected to the input line select 64 performs most of the rest of the functions of the TAC 24 of FIG. 1. Control logic 66 provides outputs to a bit counter 68 and a gap detector 70. Further outputs are supplied to a 32 bit assembly register 72, a scratch pad block 74 and a bit count and gap detect scratch pad 76. A final output is supplied to a buffer memory 78. Control logic 66 also receives an input from input line multiplex 62 as well as an input from an ASC control delimit line 80. The term ASC is a mnemonic for aircraft system coupler and was the load device for one specific implementation of the invention. A final input to control logic 66 is obtained from bit counter 68 indicating that a 32 bit word has been received by the scratch pad 74. The 32 bit assembly register 72 receives from and sends to the scratch pad 74 32-bit parallel words. It also receives an input from the input line multiplex 62. There is two-way parallel communication between the bit counter 68 and the scratch pad 76 as well as there being similar type communication between gap detect 70 and scratch pad 76. The input line select block 64 provides parallel inputs to the multiplex 62 and the scratch pad 74 as well as to an input address generator 82. Input address generator 82 also receives parallel 8-bit inputs from scratch pad 74 and supplies parallel 4-bit outputs to a buffer address gating block 84 on a line 86 and parallel 2-bit outputs to a buffer enable logic block 88 on a line 90. Scratch pad 74 also provides 24 bits of information on a parallel line 92 to buffer memory 78. Buffer address gating 84 supplies 4 bits of information on a line 94 to buffer memory 78. Buffer address gating 84 receives 4 bits of input information on a line 96 from a 6-stage counter 98. Counter 98 also provides two bits of information on a line 100 to buffer enable logic 88 which contains an output on a lead 102 containing 24 bits of information to buffer memory 78. Buffer memory 78 also supplies a 4-bit parallel output on a lead 104 to an output serializer 106. The previously referenced delimit line 80 also provides inputs to output serializer 106, buffer address gating 84, buffer enable logic 88, counter 98, and a divide by six counter 108. An ASC clock input 110 provides a clocking pulse for output signals to output serializer 106. A clock/4 signal is provided on a lead 111 to counter 108. The two inputs 80 and 110 are from a common source and are utilized to synchronize the output from the multiplexing apparatus to the load device. Counter 108 provides a parallel output of three bits to a decoder 118 and the most significant one of those three bits to counter 98. The parallel output of three bits is labeled 112 whle the most significant bit is labeled 114. The decoder 118 provides a parallel output of six bits on a lead 116 to buffer enable logic 88.

Figure 4:
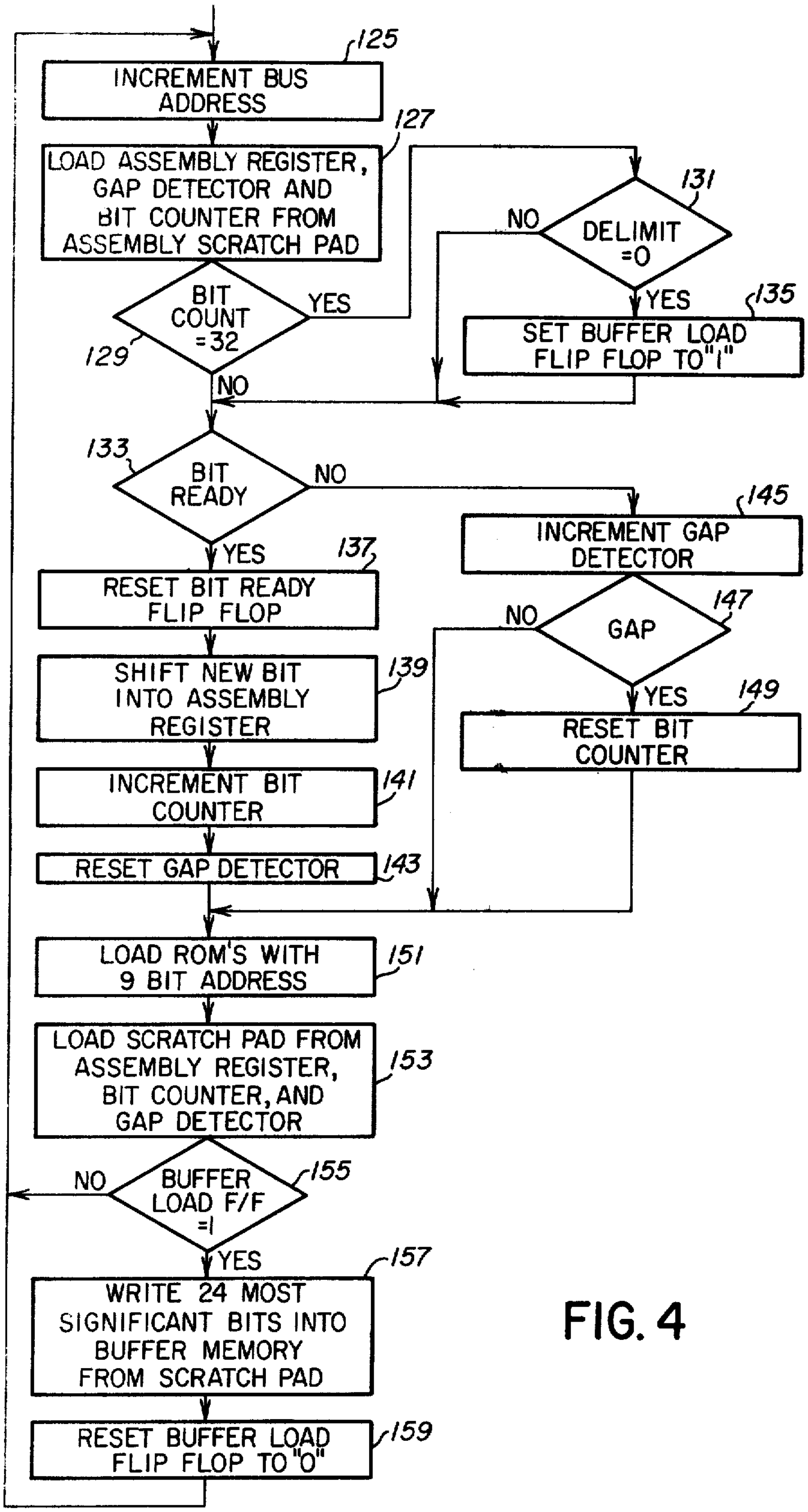
FIGS. 4 and 5 illustrate flow charts for use with the apparatus of FIG. 3.

In FIG. 4 the first state block is labeled 125 and indicates that the bus address or input line select 64 is incremented. The assembly register 72 is then loaded according to state 127 and the gap detector 70 and the bit counter 68 are also loaded each from their respective scratch pads 74 and 76. The count in bit counter 68 is then checked in decision block 129. If the bit count does equal 32 at this time, the signal on lead 80 is checked to see if delimit equals 0 is decision block 131. If it does not then the device returns to the NO output of decision block 129 and proceeds to decision block 133. The setting of delimit 80 to a logical 1 indicates that the output or load device is receiving information and thus the 32-bit word cannot be loaded into buffer memory as it would tend to disrupt data being supplied. If, however, the delimit is a 0 rather than a 1, the buffer load flip-flop (not shown) is set to a 1 in accordance with state 135 and the device proceeds to decision block 133 so that the word may be loaded into buffer memory. Decision block 133 checks to see if a bit is ready in the digital bus receiver 60. If a bit is ready, this will be so indicated by a clocking flip-flop which is set to a ready position by an incoming clock. Detection of this state will be indicated by decision block 133 and it will proceed to state 137. State 137 resets the bit ready flip-flop to its initial condition so that further receive blocks can be detected. It then proceeds to state 139 where the new bit previously indicated is shifted into the assembly register 72. The bit counter 68 is then incremented in state 141 and the gap detector 70 is reset to zero in state 143.

Returning to bit ready decision block 133, if a bit had not been ready, the gap detector 70 would be incremented in state 145 and in decision block 147 a decision would be made whether or not the numerical value in gap detector 70 is high enough to indicate that there was a gap between words. In other words, a predetermined amount of time is utilized between any digital words to signify the commencement of a new word and thus enable synchronization of the assembly device with the data supplying source. It should be noted that the timing of the embodiment shown is such that there are several samples or access times after a 32-bit word is assembled and before a gap is indicated. If decision block 147 determines that this is not a gap yet, the device will return to the output of state 143. If a gap is indicated in decision block 147 the device will continue to state 149 where the bit counter 68 is reset to a 0 so that upon the reception of the next clock a new word can be assembled. The device then proceeds to the output of state 143 where it enters state 151. In this state the read only memories of generator 82 are loaded with a combination 10-bit address wherein 2 bits are received from input line select 64 and 8 bits are received from scratch pad 74. The device then continues to state 153 where the scratch pad 74 and scratch pad 76 are loaded with the information from the assembly register 72 as well as the corresponding portions of bit counter 68 and gap detector 70. In decision block 155 the buffer load flip-flop is checked to determine its status. If its status does not equal 1 then the device returns to state 125. However, if its status does equal 1, then the device continues to state 157 where the 24 most significant bits of the word in the scratch pad are transferred into buffer memory 78 from the scratch pad. The device then continues to state 159 where the buffer load flip-flop is reset to 0 and the device returns to state 125.

As will be noted, the flow diagram of FIG. 4 is self-synchronizing through the use of the gap detector 70 wherein the bit counter is reset to 0 when a gap is detected. Thus, the device can start at any time and, within the time period of the most slowly received word on the data bus lines plus the gap between words, synchronize itself with the data sources.

Figure 5:
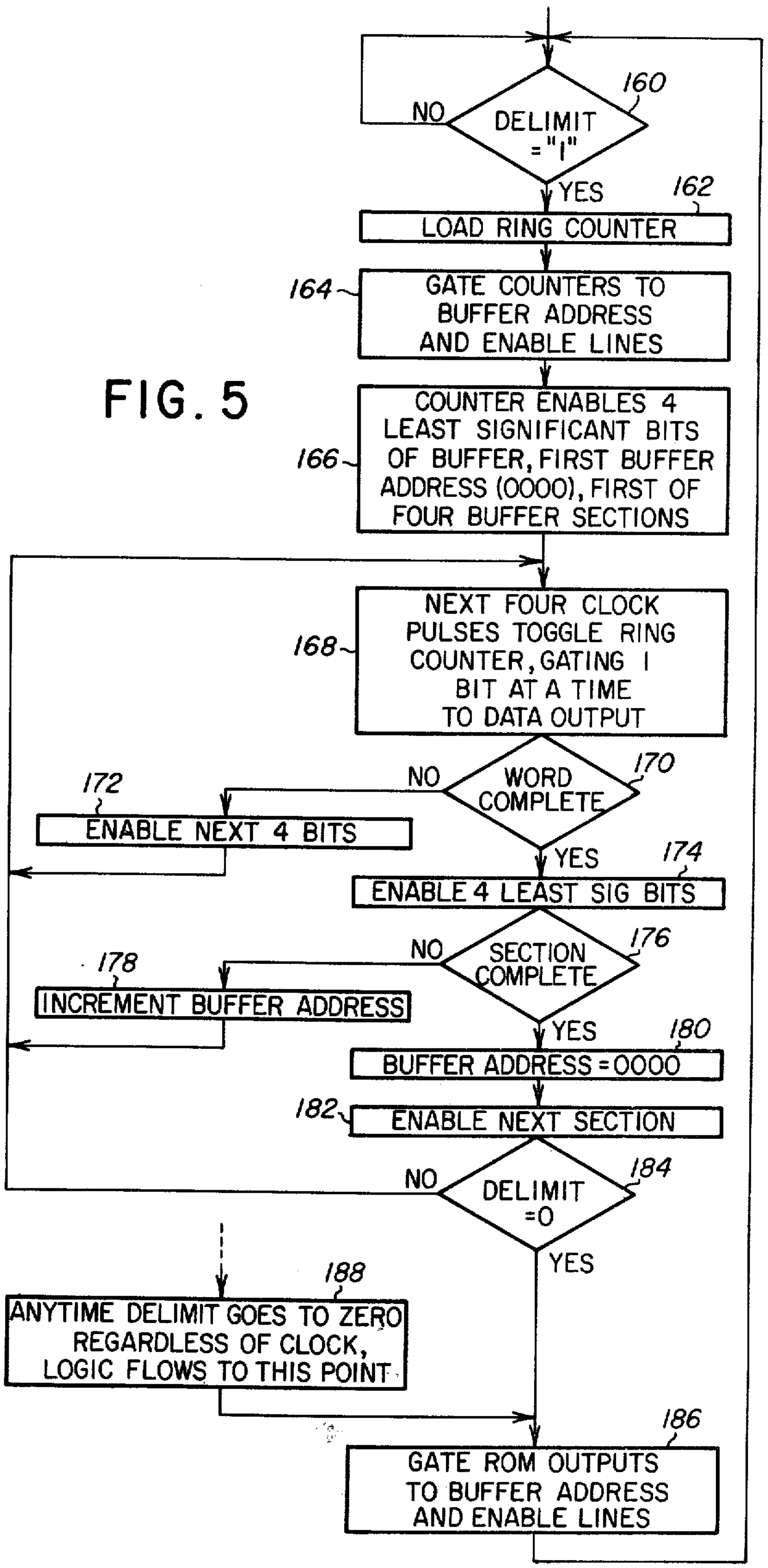

The flow diagrams of FIG. 5 and FIG. 4 occur simultaneously in control logic 66. In FIG. 5 the delimit line is checked to see if it is a logic 1 in decision block 160. If the delimit line is not 1, the device sits and idles. However, when a 1 does appear, the device continues to state 162. In state 162 a 4-bit ring counter in output serializer 104 is loaded with a single logic 1. This logic 1 is shifted around the ring counter by the clock signals being received on clock line 110. The device then continues to state 164 where the buffer address gating 84 and the buffer enable logic 88 are switched to receive inputs on lines 96, 100, and 116 rather than 86 and 90. The device proceeds to state 166 wherein the counter 98 enables the four least significant bits of the RAM's (Random Access Memory) in buffer memory 78 via lines 96 and 94. The device then proceeds to state 168 where the next four clock pulses toggle the ring counter in output serializer 106 gating one bit at a time to the data output lead. In decision block 170 a check is made to see whether or not a complete word has been transmitted from buffer memory 78. If it has not, the next four bits in the word are enabled in state 172 and the device returns to state 168. If the word is complete then the next four least significant bits are enabled in state 174 via lines 96 and 94 to the buffer memory 78. A check is then made in decision block 176 to see if that section is now complete. If it is not the buffer address 84 is incremented in state 178 and the device returns to state 168. If the section is completed, then the 4-bit buffer address on lead 94 is returned to 0000 and the device then enables the next section of buffer memory 78 in state 182. A decision is made in decision block 184 as to whether the delimit line 80 is still a logic 1 or not. It is is a logic 1 thereby indicating that more data is to be received, the device returns to state 168. However, if the delimit line is now logic 0 then the device continues to state 186. This indicates that the load is no longer interested in receiving any more information and thus in gate 186 the outputs from the ROM's (Read Only Memories) of address generator 82 are now gated to assume control over the address gating in blocks 84 and 88. Thus, the device can return to decision block 160 to idle until further data is required.

As may be ascertained by decision block 188, any time that the delimit line returns to 0 the device will go to state 186 and continue receiving data from the input lines. One specific embodiment of the invention was designed such that the load could retrieve data from the buffer memory 78 until it had received the desired data and then shut off. In some cases the load may read the entire buffer memory one or more times and in other instances would, by accident, receive all the desired information in one or two words. When the desired information is received, the delimit line 80 is dropped to a logic 0 and the device can continue receiving data from the data bus lines, assemble these data bits into words in the register 72 and store the assembled words in buffer memory 78.

The flow diagrams and the block diagrams are somewhat confusing unless it is understood that the limitation is taken into account that the buffer memory can receive 24 data bits in parallel from the scratch pad but the output serializer can only provide one data bit at a time to the load. While an output serializer could have been provided which would accept the entire 24-bits simultaneously and would output these one at a time, design considerations were such that the buffer memory was constructed utilizing 24 RAM's (Random Access Memory) each of which would contain 16 four-bit segments of a word. These are arranged, as shown in Chart No. 1 below, so that a given section, starting with the first section of six RAM's, receives a 24-bit input word in parallel and one RAM at a time is connected to the output serializer 106 in consecutive order from least significant to most significant bit. The buffer memory 78 is further constructed so that there are four sections each containing six RAM's. Thus, the buffer enable logic 88 contains 24 output lines each of which is connected to a separate individual RAM and the order of which is dictated by the outputs of counter 98 and decoder 118. Decoder 118 provides an input to buffer enable logic 88 of six bits which is used to indicate which one of the vertical columns of RAM's in a word is to be decoded at any given time.

Reference to Chart No. 1 will illustrate that there are 24 RAM's divided as indicated supra into bit portions of a word and sections of words. The four incoming bits from buffer address gating 84 to the buffer memory are applied to all 24 RAM's to be used in activating a particular one of 16 words in each of the RAM's. However, the 24-bits from buffer enable logic 88 only select a single given RAM to energize when data is being outputted and selects only six RAM's in a given section when data is being inputted. Therefore, the data bits to be moved can be selected in a four-bit portion or a 24-bit word.

CHART No. 1

| | BITS 0–3 | BITS 4–7 | BITS 8–11 | BITS 12–15 | BITS 16–19 | BITS 20–23 |
|---|---|---|---|---|---|---|
| SECTION 1 WORDS 000000–001111 | RAM No. 1 | RAM No. 2 | RAM No. 3 | RAM No. 4 | RAM No. 5 | RAM No. 6 |
| SECTION 2 WORDS 010000–011111 | RAM No. 7 | RAM No. 8 | RAM No. 9 | RAM No. 10 | RAM No. 11 | RAM No. 12 |
| SECTION 3 WORDS 100000–101111 | RAM No. 13 | RAM No. 14 | RAM No. 15 | RAM No. 16 | RAM No. 17 | RAM No. 18 |
| SECTION 4 WORDS 110000–111111 | RAM No. 19 | RAM No. 20 | RAM No. 21 | RAM No. 22 | RAM No. 23 | RAM No. 24 |

As previously indicated, a 4-bit ring counter in serializer 106 is clocked by the input from lead 110. An output appears on lead 111 every fourth clock occurrence on 110 or in other words whenever the "1" in the ring counter makes a complete cycle. This clock/4 signal is applied to the divide by 6 counter 108 which is a 3-bit counter that starts over at "0" after it reaches 6. Such a counter may be purchased from Texas Instruments Company of Dallas, Texas under the part number SN5492. The most significant bit, as obtained on lead 114, will be a logic 1 for the last two counts with 0 being the first count and 4 and 5 being the last two counts. The decoder 118 would thus provide an output on one of the six lines of 116 to attempt to activate one of the vertical columns, such as RAM's 1, 7, 13, 19, with a count of 0 from counter 108. When the four bits of this column have been outputted, a pulse is applied on 111 to obtain an output count of 001 to decoder 118 and thereby activate the second vertical column of RAM's. Every six inputs counts on line 111 produces an output of the most significant bit on line 114. Since both counters 98 and 108 are reset to 0 upon the occurrence of logic 1 to the delimit line 80, the output from counter 98 would be initially all or six 0's. The four least significant bits appear on lead 96 and the two most significant bits appear on lead 100. It can thus be ascertained that the two most significant bits will define the section of the buffer memory while the four least significant bits will define the individual one of 16 words in a section. Thus, the inputs from blocks 98 and 118 are utilized by buffer enable logic 88 to define a specific RAM and the four bits appearing on lead 96 define the specific word in each section. Although the four-bit word defined by the bits on lead 96 is applied to all 24 RAM's, only 1 RAM is energized due to the 24 outputs on lead 102.

During the normal word assembly times, the switches within blocks 84 and 88 are such that only the gating information from generator 82 is applicable. The two bits from lead 90 define the section as will be observed by the two most significant bits shown in the sections of Chart No. 1 and the four bits received on lead 86 define the specific word within a section. The address generator 82 contains 10 address input leads and utilizes a matrix to decode these inputs and define 64 addresses within buffer memory 78 to place the 24-bit data portions of the words from scratch pad 74. As previously indicated, one of the word positions in buffer memory is merely a sink and is not utilized for reading.

In summary, therefore, it may be ascertained that as long as the load is not requesting data, the control logic is continually incrementing the input line select to sample each incoming line selectivity. If further clock information has not been received since the last data sample then the bit ready flip-flop has not been set. Thus, the device effectively passes to the next line without accomplishing anything. However, because of lead times involved, the word has been retrieved from the scratch pad and placed in the assembly register and then returned. When it is found that a clock has been received, this bit is supplied to the assembly register and the bit counter incremented so that a check may be made when the complete 32 bits are assembled and so that the completed word may then be supplied to buffer memory. Eight of the 32 bits of the assembled word are utilized to provide an address to the address generator 82. As previously indicated, some of the lines may provide data which is not relevant to the requirements of the load. Since each incoming digital word would contain a different address, the addresses of information which are not utilized by the device can be inserted into the input address matrix 82 whereby the undesired information is placed in a given portion of storage and that data never retrieved. Data is continually being sent to this portion in storage as an effective way of disposing of same. The rest of the data, however, is placed in preselected portions of storage and retrieved whenever the delimit line is raised to a logic 1. As also indicated, a gap detect is utilized to provide synchronization of the device with the incoming data lines by resetting the bit counter to 0 when a gap is detected thereby commencing assembly of a word with the first bit after a gap.

When the delimit line is raised to a logic 1, the input clock is counted and decoded and applied to the gating circuits 84 and 88 to output the information from the buffer memory one 4-bit portion of a word at a time into output serializer 106 via a 4-bit ring counter and then serially to the data output line.

As will be realized, in some instances digital words may be received from a given data source and placed in the same place in memory several times before being retrieved by the load device. In the environment for which this apparatus was designed, this is not detrimental as the load is only interested in the latest readings. In other words, the data source information may be such items as temperature or wind velocity and past information is not pertinent. Therefore, the present apparatus acts as a last information received device and provides as an output this data only when the load so requests. As utilized in this specification, "different" data rates may be large differences or such small differences that there is merely a small or slow phase change. As will be realized, even small phase changes would require different oscillators in the prior art.

Figure 6:
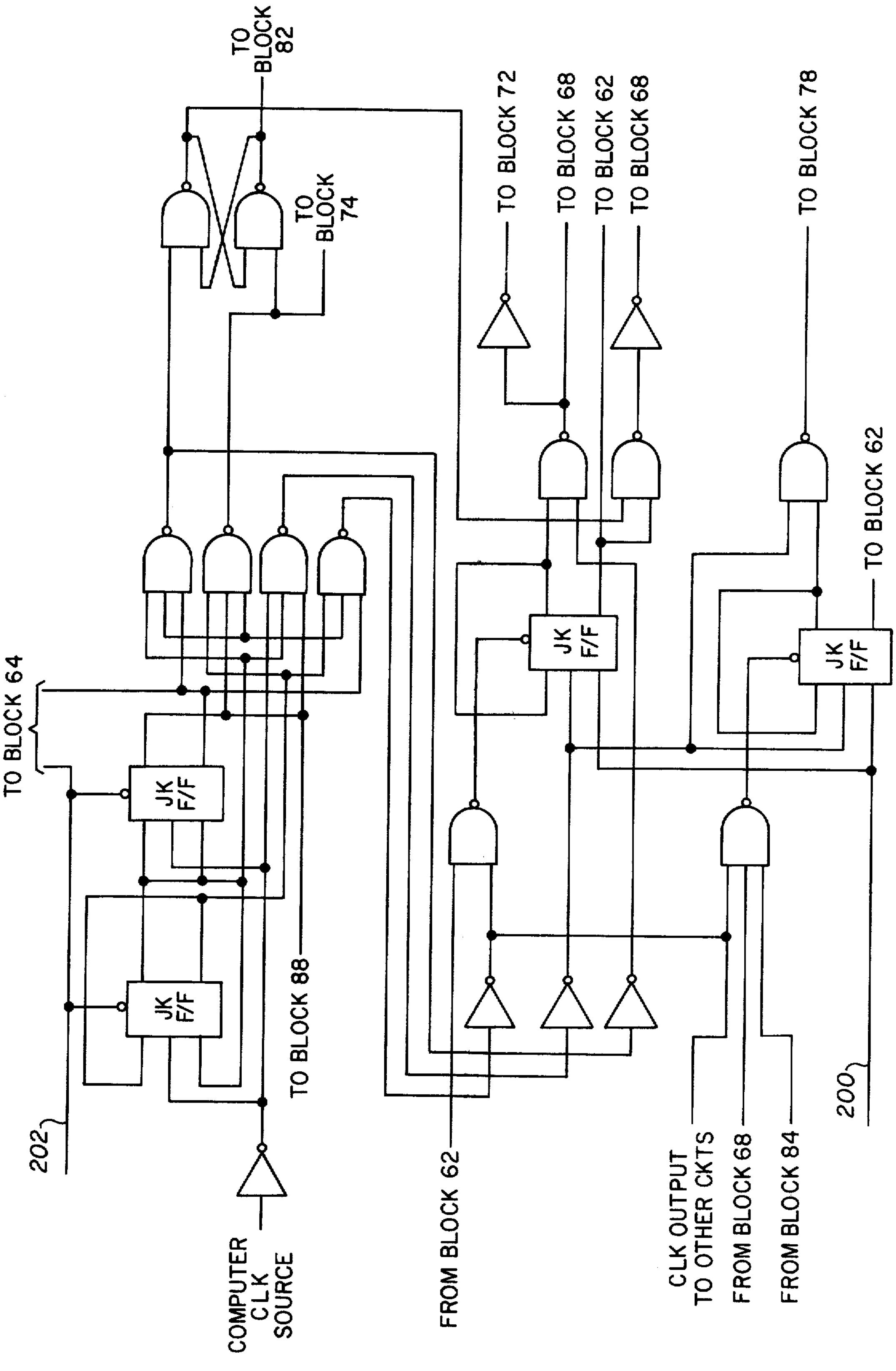
FIG. 6 illustrates a possible schematic diagram connection for implementing a portion of control logic block 66.

FIG. 6 illustrates one possible embodiment of the portion of control logic 66 which would satisfy the requirements of the flow design of FIG. 4. This circuit provides timing pulses and control signals necessary for inputting words into the scratch pad 74 of FIG. 3 as illustrated in the flow diagram of FIG. 4. The design of this timing circuitry would be obvious to any one skilled in digital component designing techniques and thus will not be elaborated upon greatly. As will be noted, the entire circuit comprises inverting amplifiers for providing circuit isolation and in some instances inversion of signal levels, NAND circuits for gating functions and JK flip-flops. The designators 200 and 202 are used for two different lines which provide logic 1 signal levels to different portions of JK flip-flops in this and other circuits of the inventive system. The JK flip-flops are presented in their normal configuration in that the upper terminal is the set input and from top to bottom on the left hand side are the J, clock and K inputs, while on the right hand side are the T and F outputs. The rest of the leads coming to and leaving the circuit of FIG. 6 are given designations as to which blocks of FIG. 3 the leads will be connected. The one exception to the last statement is the clock output lead which is sent to several of the blocks of FIG. 3. While it is believed that anyone skilled in the art with the above disclosure can design specific logic circuitry to fulfill the concept of the invention, the following is provided for additional information data to simplify any material-gathering problems in designing a specific embodiment. The blocks 10 and 18 are merely terminals which receive respectively data inputs and associated clock inputs from a source or sources not the subject matter of the present invention. The block 26 is a shift register. In the embodiment illustrated four bit shift registers produced by Texas Instruments, illustrated in a brochure dated Aug. 1, 1969 and given the No. 54L95 are usable with eight of these devices being used to complete the black box 26. The digital bus receiver 60 may be a device the same as or similar to a Signetics Corporation receiver labeled 8T-16 as found in a 1971 Signetics publication. The input line multiplexer 62 may be a device the same as or similar to an eight bit multiplexer produced by Fairchild Semiconductor and given the designation 93L12. The line select block 64 may be the same as a Fairchild Semiconductor four bit binary counter given the label 93L16. These two Fairchild circuits may be found in a Fairchild publication dated Sept. 1971. The control logic 66 is comprised of a plurality of AND, NAND, NOR and OR gates combined with a few flip-flops in accordance with the flow diagrams of FIGS. 2, 4 and 5. The gap detect block 70 may be a four bit presettable counter such as supplied by Signetics under the designation 8281 as also found in the above referenced Signetics publication. The bit counter and gap detect scratch pad 76 may be the same as produced by Harris Semiconductors of Florida in a 64 bit RAM under the designation HRAM-64 and described in a Harris spec sheet dated April 1971. The input address generator 82 may be similar to a ROM produced by Collins Radio Group of Rockwell International, under the designation of CRC 3502 and described in a spec sheet issued in July 1971. The buffer address gating may comprise six SG71 dual 2—2 input AND/NOR gates as available from various manufacturers in the electronic industry such as in a Sylvania specification sheet dated 10/1/66. These may be found for sale in various electronic catalogs. The buffer enable logic 88 may comprise 30 gates described as 54LOO and found in the above referenced T. I. brochure. The further blocks such as counters and decoders are completely self-explanatory and need no further explanation.

Since the specific design circuitry is apparent to those skilled in the art, further exemplary schematics have not been provided. However, for informational purposes the schematic drawings illustrating the entire invention may be obtained from the file history of the parent application of which this patent is a continuation in part.

While a specific embodiment has been described, it is to be realized by those skilled in the art that the invention lies in the concept of retrieving data from input lines without the necessity of a plurality of clocking oscillators each synchronized to the data rate of the incoming lines as outlined in the appended claims. Other inventive concepts are also outlined in the appended claims wherein:

We claim:

1. Apparatus for sampling digital data bits on a plurality of lines wherein the data bits are supplied at at least two different rates comprising, in combination:

a plurality of digital data source means some of which supply data at different rates; means for supplying a clock signal in conjunction with each data bit;

multiplexing means connected to each of said aforenamed means for receiving data and clock signals therefrom, said multiplexing means completing a cycle of sampling all of said data sources in a predetermined order in no greater time than the bit period of the highest rate data source means;

resettable data indication means for providing an indication of receipt of a clock signal in conjunction with a data bit;

scratch pad memory means for supplying and receiving data words in different locations in accordance with said predetermined order;

word assembly means, connected to said multiplexing means, said data indication means and said scratch pad means, for retrieving data words as assembled to date from said scratch pad memory means in said predetermined order;

means, forming a part of said word assembly means, for updating the retrieved word with a further data bit when same is received concurrently with an indication of receipt of a clock signal by the apparatus;

means, forming a part of said word assembly means, for resetting said data indication means to a clock signal not received condition and for returning the updated word to the location in said scratch pad memory from which it was retrieved; and output means connected for receiving said data word after it is completely assembled in said word assembly means.

2. Apparatus as claimed in claim 1 wherein said data words each contain labels designating a source of said word and said output means comprises:

addressable storage means including a dump section;

detection means for decoding the label of said data words as received and directing the nonlabel portion of selected data words to predetermined sections in said addressable storage means and the rest of the data words to said dump section; and parallel to serial conversion means for serially outputting the data words in said predetermined sections.

3. Apparatus as claimed in claim 1 and comprising, in addition:

clock scratch pad means connected to said data source means for incrementing a digital number contained therein corresponding to the number of data bits received in a word being assembled as the indication means is reset for receiving further clock signals.

* * * * *